Dec. 26, 1933.  L. E. WELLS ET AL  1,941,193
METHOD OF MAKING COMPOSITION CONTAINERS

Filed June 4, 1931

Inventors.
Leland E. Wells
Edward Fairclough
Kwis Hudson & Kent
attys.

Patented Dec. 26, 1933

1,941,193

UNITED STATES PATENT OFFICE

1,941,193

METHOD OF MAKING COMPOSITION CONTAINERS

Leland E. Wells, Cleveland Heights, and Edward Fairclough, Cleveland, Ohio, assignors to Willard Storage Battery Company, Cleveland, Ohio, a corporation of West Virginia Application June 4, 1931. Serial No. 542,078

5 Claims. (Cl. 18—19)

This invention relates to an improved method of molding composition containers, having reference principally to the molding of storage battery containers from bituminous compositions.

One of the objects of the invention is the provision of a method of molding composition containers which shall result in a container the walls of which are dense at and near the surfaces, producing a container having not only a better finish, but one less subject to acid absorption and to consequent deformation under the action of heated electrolyte.

It is another object of the invention to effect economy of material by saving the bitumen which is struck up in a flash at the top of the container in the methods now in common use.

Another object is the elimination of incrustations on the molds, which require removal by cleaning before the molds may be used in the succeeding molding operations.

Other objects and features of novelty will appear as we proceed with the description of the improved method in connection with the attached drawing showing somewhat diagrammatically one form of apparatus which may be employed in carrying out the method.

Figure 1:
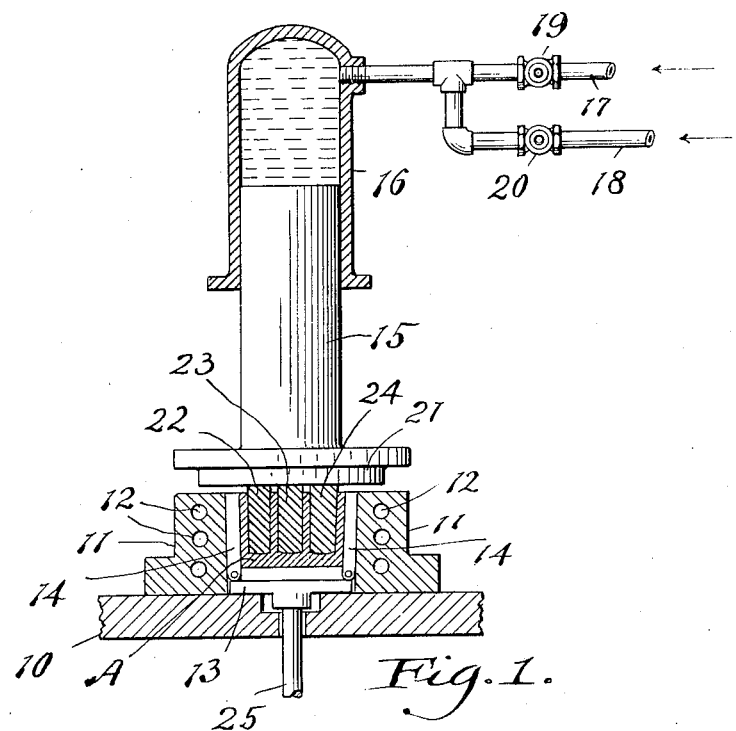
Figure 1 is an elevational view, partly in vertical section, of a mold press, showing the positions of the parts at the conclusion of the first pressing operation.

In accordance with the present invention as applied to the molding of battery containers from heated bituminous compositions, we place in the bottom of the mold a mass of the heated composition of a predetermined quantity sufficient to form the container. The platen, to which the core or cores are attached, is then caused to descend more or less slowly under a relatively light pressure to force the plastic material into all of the spaces between the mold and the core to form a homogeneous article. This pressure is continued for so long as the plunger continues to move. When the resistance to movement offered by the plastic material becomes sufficient to stop or substantially stop the movement of the plunger, the pressure being exerted upon the mold is maintained for a predetermined period. During this interval the heat remaining in the composition through the molding operation up to that time is partially dissipated through the metal walls of the mold, particularly the heat at and near the surfaces of the article. When this period has continued through the time interval, the length of which is predetermined by experiment, the operator turns on a heavy hydraulic pressure for completing the closing of the mold which compacts the molded article and renders the surface thereof dense and smooth and imparts to it an even gloss over its entire extent.

The light pressure employed in the first step of the process is not sufficient to squeeze out of the composition any of the liquid, principally bitumen, contained therein. This squeezing out of bitumen has been one of the faults of the methods heretofore employed. In such methods the bitumen which, in its heated state, is quite fluid, is squeezed out of the composition in the form of a fin or flash along the joint between the mold and core. This extrusion of bitumen causes considerable difficulty in that it necessitates careful cleaning of the mold plates and core after each operation, and also in that the repetition of the wedging action of the extruded material tends gradually to widen the cracks between the mold plates and core, so that the amount of flash increases with the use of the mold. Furthermore, the bitumen escaping in this way results in a partial loss of effective pressure on the molded mass, as soon as the movement of the ram is stopped, due to the complete closure of the mold. Then, when the molded mass shrinks due to cooling, it pulls away from the walls of the mold and core, whereas the pressure should be maintained during the cooling of the molded article so as to prevent such shrinkage. Furthermore, some of the bitumen which should have gone into a surface coating to cover the fibrous material in the composition, is lost.

The hardening of the composition at the surfaces of the molded article which takes place between the conclusion of the first compression step and the beginning of the second compression step prevents the extrusion of bitumen when the heavy pressure is turned on. Consequently there is no loss of bitumen or of pressure, and there is no incrustation of the mold plates and cores by such extruded material which, in the methods heretofore practiced, necessitated cleaning of the mold cores and surfaces between successive operations.

In the drawing the bed of a hydraulic press is indicated at 10. Upon it are mounted outer mold members 11 which may be provided with passages 12 for the circulation of steam for heating or water for cooling. The inner walls of these members are preferably inclined slightly to facilitate the removal of the molded article, as is common in the art. A bottom mold plate 13 normally rests upon the bed 10 within the enclosing members 11, and mold side plates 14 are connected with the bottom plate 13 in such manner that they may be drawn or swung outward when not confined by the members 11.

A ram 15 extends into a cylinder 16, which may be connected with either one of two fluid pressure lines 17 and 18, which are fitted with valves 19 and 20 respectively. On the bottom of the ram 15 there is a platen 21, to which are attached core members 22, 23 and 24. When the molding operation is completed and the core withdrawn, the mold plates containing the molded article may be raised by means of a reciprocable push bar 25, which extends upwardly through the bed 10 and is attached to the bottom plate 13 of the mold.

Figure 2:
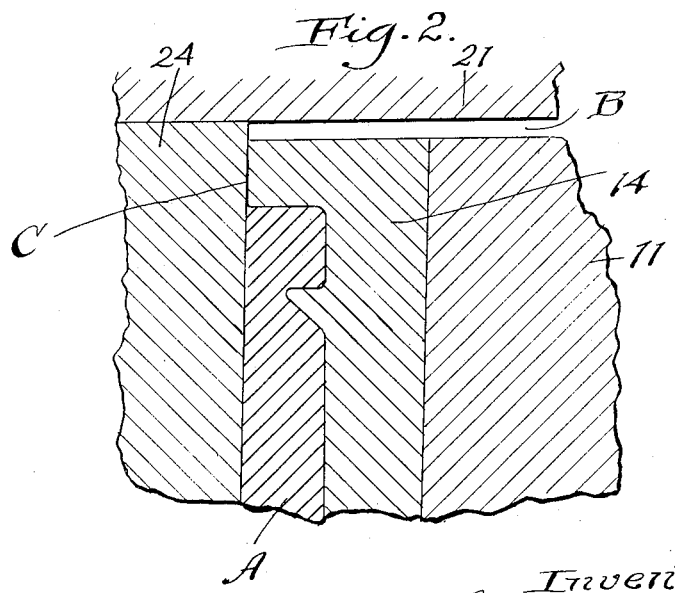
Fig. 2 is a fragmental view on a larger scale showing a corner of a battery container being molded, with the adjacent parts of the molding apparatus in the position of Fig. 1.

In carrying out our method by the use of the apparatus described, a heated mass of bituminous composition, containing for instance bitumen, fiber and filler, is placed upon the bottom plate 13 of the mold. The valve 20 is turned on to force the ram and the cores 22, 23 and 24 downward slowly against this mass. The composition is gradually forced into spaces existing between the mold plates and the cores, taking the form indicated at A in Fig. 1. The resistance offered by the plastic mass gradually increases, and finally becomes sufficient to overcome the pressure available through pipe 18, which for example may be 200 lbs. per square inch. The movement of the plunger then ceases. At this time the relative positions of the mold and platen with its cores will be substantially as shown in the drawing, the space B—Fig. 2—being of the order of one-eighth of an inch deep.

Now, instead of immediately closing valve 20 and opening valve 19 to admit the high pressure fluid to the cylinder 16, we interpose a period of waiting, the length of which depends somewhat upon the character of the composition, particularly the bitumen. The length of this idle period is sufficient to enable the partially molded article to cool somewhat, particularly on its surfaces. This time interval may vary considerably, but it is our present belief that it need not exceed sixty seconds in any case, and that it will be at least as great as ten seconds in all cases. The cooling action in any event must be sufficient to change the character of the composition at the surface to eliminate practically all fluid, in other words to convert such fluid by cooling to a plastic consistency.

When the proper time interval, determined by experiment for any given set of conditions, has elapsed, the valve 20 is closed and the valve 19 opened, admitting liquid under relatively high pressure to the cylinder 16. This pressure may be from five to ten times that employed in the first compression operation, say for example 2000 lbs. per square inch. The platen then quickly descends to eliminate space B, and further compresses the molded article. The strength and finish of the article are greatly enhanced by this final step, and the flash, indicated at C in Fig. 2, instead of being considerable, is, if present at all, a mere film upon the adjacent surfaces of the mold plates 14 and the cores.

While in the foregoing description we have necessarily gone somewhat into detail in order to explain a practical embodiment of the invention, we desire it to be understood that such detail disclosures are not to be construed as amounting to limitations, except as they may be included in the appended claims.

Having thus described our invention, we claim:

1. A method of molding an article, which comprises compressing heated plastic material in a mold under relatively low pressure until the resistance of the material stops the compression, then partially cooling the walls of the article, and then further compressing the article under heavy pressure.

2. A method of molding an article from a heated bituminous composition, which comprises compressing the composition in a mold under relatively low pressure until the mold is nearly closed, then partially cooling the walls of the article, and then further compressing the article under heavy pressure.

3. A method of molding an article from a heated bituminous composition, which comprises compressing the composition in a mold under a pressure of between one hundred pounds and five hundred pounds per square inch until the mold is nearly closed, then permitting a time interval of from ten to sixty seconds to elapse, during which the walls of the article are partially cooled, and then further compressing the article under a pressure of from fifteen hundred pounds to three thousand pounds per square inch.

4. A method of molding an article from a bituminous composition, which comprises heating the composition until some of its constituents are of a liquid consistency, compressing such composition in a mold until the mold is nearly closed but under a pressure insufficient to squeeze out the liquid, permitting a time interval to elapse during which said pressure is maintained and during which said liquid congeals more or less, and then further compressing the article under heavy pressure until the mold is completely closed.

5. A method of molding an article from a bituminous composition, which comprises heating the composition until certain of its constituents become of a liquid consistency, compressing the composition in a mold under a pressure of between one hundred pounds and five hundred pounds per square inch until the mold is nearly closed but under a pressure insufficient to squeeze out the liquid, then permitting a time interval of from ten to sixty seconds to elapse, during which the said liquid constituents cool down to a plastic or semi-plastic state, and then further compressing the article under a pressure of from fifteen hundred pounds to three thousand pounds per square inch.

LELAND E. WELLS.
EDWARD FAIRCLOUGH.